Nov. 20, 1956 A. G. DEAN 2,771,039
SAFETY SUPPORT FOR TRUCK-MOUNTED ARTICLES
Filed July 1, 1954
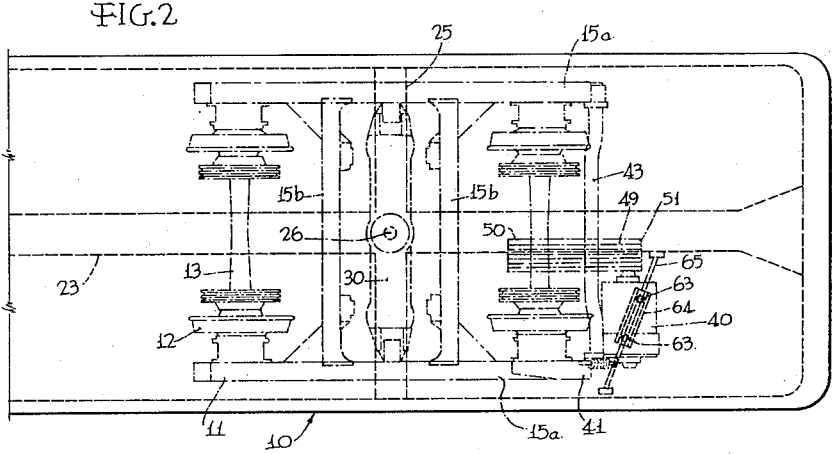
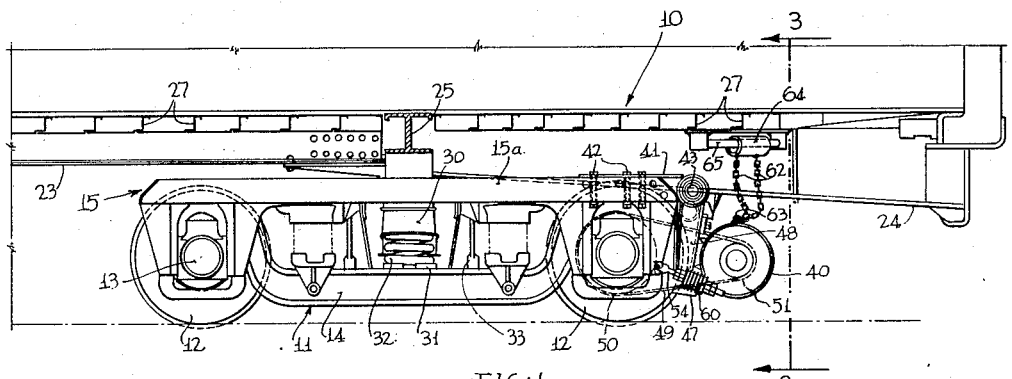
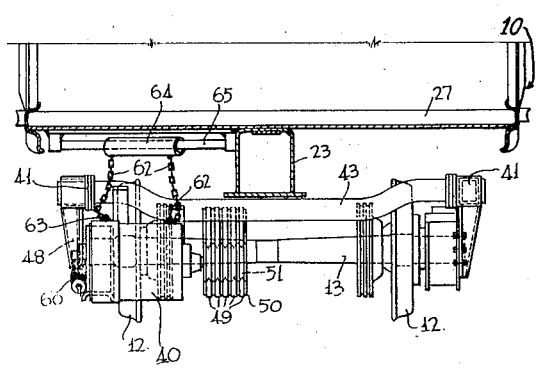
FIG. 3
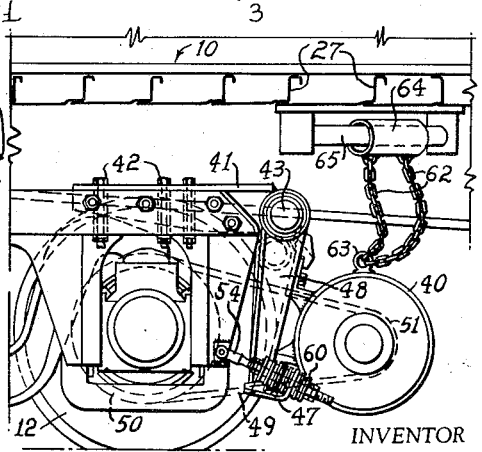
FIG. 4
INVENTOR
Albert G. Dean
BY
William R. Glisson
ATTORNEY

United States Patent Office 2,771,039
Patented Nov. 20, 1956

2,771,039

SAFETY SUPPORT FOR TRUCK-MOUNTED ARTICLES

Albert G. Dean, Narberth, Pa., assignor to The Budd Company, Philadelphia, Pa., a corporation of Pennsylvania Application July 1, 1954, Serial No. 440,795

2 Claims. (Cl. 105—217)

This invention relates to a safety support for truck-mounted articles and has for an object the provision of improvements in this art.

When any item is mounted beneath the floor of a vehicle it must be secured with the greatest care to avoid the possibility that it may drop down on the roadway to cause damage to either the item or the vehicle. When the item is mounted on the running gear, such as the truck of a railway car, it is necessary to use even greater care in making the support secure because the truck is subjected to heavy and continuous vibration due to the direct pounding of the wheels on the rails.

An example of an item which requires very reliable safety support is a truck-mounted generator such as that disclosed in the pending application of Albert G. Dean and Walter B. Dean, Serial No. 355,658, filed May 18, 1953, now Patent No. 2,743,680, May 1, 1956.

An illustrative embodiment of the invention is shown in the accompanying drawings wherein:

Fig. 1 is a side elevation of a portion of a railway car embodying the invention;

Fig. 2 is a horizontal plan and section of the parts shown in Fig. 1;

Fig. 3 is a transverse section and elevation taken on the line 3—3 of Fig. 1; and Fig. 4 is an enlarged elevation of parts shown on the right hand side of Fig. 1.

In the illustrated embodiment a railway car 10 is provided with trucks 11 having wheels 12, axles 13, equalizer beams 14, and a truck frame 15.

The car frame includes a center sill 23, draft gear 24, a heavy cross bearer 25 carrying a king pin 26 on which the truck turns, and floor cross beams 27.

The truck frame 15 comprises longitudinal side members 15a and transverse members or transoms 15b. The side members 15a project beyond the frame proper to support an item such as a generator 40. A bolster 30 which has means cooperating with the king pin 26 is supported from a plank 31 and springs 32 thereon from swing hangers 33 carried by the transoms 15b.

Extension brackets 41 are secured to the side members 15a by bolts 42 and carry a tubular cross beam 43 in rubber lined sockets. The generator 40 is supported on the beam 43 by a bracket 47 carried from the beam by depending arms 48.

The generator is driven by a belt 49, comprising a plurality of separate V-strands, through a pulley 50 carried by the axle 13 and a pulley 51 on the generator shaft. The belt is kept tight by an adjusting rod 54 carrying rubber pads 60.

It will be seen that the generator is mounted very low on the frame and must be held up clear of the tracks. According to the present invention safety suspension means are provided for the generator, the means provided being such as to permit all necessary turning movements of the generator with the truck frame while at all times maintaining so close a connection with the generator that it cannot fall down appreciably if it should work loose or break away from its principal means of support.

The safety supporting means comprises flexible connectors such as chains 62 secured at the lower end to eye members 63 made fast to the generator casing, as by welding, and secured at the upper end to a slide or carriage 64 which is mounted for sliding movement on a bar or track 65 carried by the car frame.

The bar 65 is mounted and arranged so as practically —or if curved, exactly—to lie on the arc of a circle drawn from the axis of turning of the truck. As shown, the bar is straight and the slide 64 is formed as a sleeve which fits loosely on the bar.

In normal travel the degree of turning is not great and not sudden so that track vibration will cause all necessary shift of the sleeve slide with very little pull on the chains. At roundhouses and other places where track curves may be sharper the chains will be pulled somewhat more in shifting the sleeve but in no case will the pull on the chains be heavy. In all positions the chains will support the generator clear of the track and ties if it should break loose from its normal supports on the truck.

It will thus be seen that the invention provides a secure secondary support for the generator from the car body if it should break from its supports on the truck. Also the construction is simple and inexpensive and easily installed or removed.

While one embodiment of the invention has been disclosed for purposes of illustration, it is to be understood that there may be other embodiments within the general scope of the invention.

What is claimed is:

1. A safety support for a power device on a car truck, comprising in combination, a wheeled truck turnably connected to a car body, a power device mounted on the truck and having a drive connection with the car wheels; a transverse support bar secured beneath the car body, a member slidable on said support when the truck turns, and flexible and normally slack supporting means connected to said member and said power device to provide a safety support if the power device should break away from its support on the truck.

2. A safety support for a power device on a car truck comprising in combination, a wheeled truck turnably connected to a car body, a power device mounted on the truck and having a drive connection with the car wheels, a transverse support bar secured beneath the car body above the power device and generally aligned with the line of movement of the power device as the truck turns, a slide mounted on said bar for movement thereon when the truck turns, and flexible and normally slack supporting means connected to said slide and to said power device and being of such length as to hold the power device off the track if the power device should break away from its support on the truck.

References Cited in the file of this patent

UNITED STATES PATENTS

| | | |
|---|---|---|
| 1,049,103 | Kennedy | Dec. 31, 1912 |
| 1,374,523 | Pitt | Apr. 12, 1921 |
| 1,397,122 | Balderston | Nov. 15, 1921 |
| 1,475,241 | Parke | Nov. 27, 1923 |